(No Model.)

M. HARMON.
SEED PLANTER.

No. 592,112. Patented Oct. 19, 1897.

Witnesses,
Albert Popkins,
N. C. Harper

Inventor
Martin Harmon
By W. A. Ruff
Attorney

UNITED STATES PATENT OFFICE.

MARTIN HARMON, OF BLOOMINGTON, ILLINOIS.

SEED-PLANTER.

SPECIFICATION forming part of Letters Patent No. 592,112, dated October 19, 1897.

Application filed June 12, 1897. Serial No. 640,458. (No model.)

*To all whom it may concern:*

Be it known that I, MARTIN HARMON, a citizen of the United States, residing at Bloomington, in the county of McLean and State of Illinois, have invented certain new and useful Improvements in Hand Seed-Planters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to seed-planters; and its object is to provide an improved construction of the same which shall possess superior advantages with respect to efficiency in operation.

The invention consists in the novel construction and combination of parts hereinafter fully described and claimed.

Figure 1:
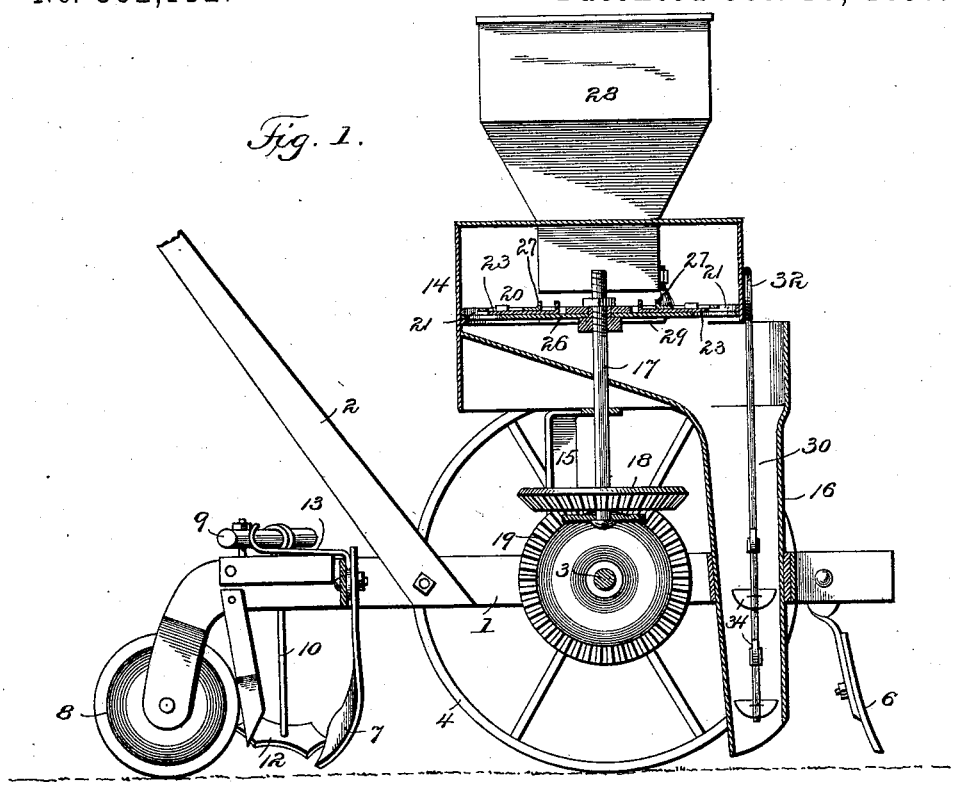
Figure 2:
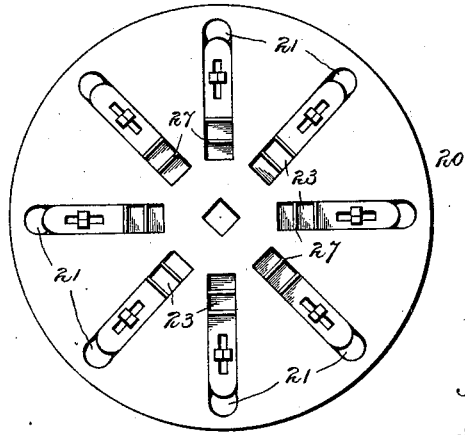
Figure 3:
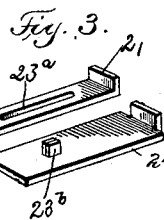
Figure 4:
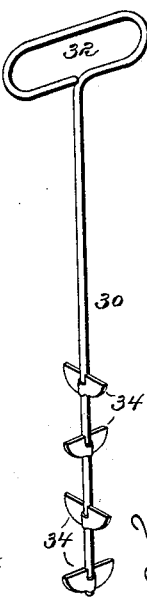

In the accompanying drawings, Figure 1 is a central longitudinal sectional view of a seed-planter constructed in accordance with my invention. Fig. 2 is a plan view of the seed-wheel. Fig. 3 is a view of one of the seed-slides removed. Fig. 4 is a view of the removable scatterer or agitator adapted to be placed in the seed-spout.

In the said drawings the reference-numeral 1 designates the frame of the machine; 2, the handles secured to the sides thereof; 3, the axle, and 4 the supporting-wheels at the ends of the axle. At the front of the frame is a shovel 6, and at the rear a coverer or furrow-turner 7. Journaled in a bracket at the rear of the frame is a covering-wheel 8. Also pivotally connected with said bracket is an arm 9, provided with a rod 10, having a marker 12 at the lower end. A hooked rod 13 limits the backward movement of the arm 9.

The numeral 14 designates the seedbox, cylindrical in shape and mounted upon brackets 15, secured to said frame. At the front this box is provided with a depending seed-spout 16, the lower end of which is just in rear of the shovel 6. This box is provided with a curved inclined bottom by which the seed from the seed-plate are directed to the spout. The numeral 17 designates a vertical shaft extending through said bottom and provided at the lower end with a gear-wheel 18, which meshes with a toothed wheel 19, secured to the axle. Fixed to the upper end of said shaft is a seed-wheel 20, provided with a number of radial seed-openings 21. Located in these openings are slides 23 for adjusting the area of said openings, so as to admit of varying sizes of seed. These slides consist of metal plates formed with slots $23^a$, with which engage projections $23^b$, upon plates 24, confined between the seed-plate and a plate 26, secured thereto. Said slides are also provided with projections 27 for moving them in and out. The numeral 28 designates a seed-hopper provided at the lower end with a brush. The lower end of this hopper terminates just above the seed-plate, and underneath the latter is a stationary plate 29 for holding the seed in the seed-openings until said openings have passed from beneath the hopper.

The numeral 30 designates a device which may be placed in the seed-spout to cause the grain to scatter, if desired. It consists of a rod formed at the upper end with a handle 32, and near the lower end with a series of plates 34, at right angles to each other.

The operation will be readily understood. As the machine is pushed along, the seed-plate will be rotated, causing the seed-openings to be brought successively under the hopper, when a seed will fall into the opening and be retained therein by the plate 29 until the opening shall have passed the latter, when the seed will drop onto the inclined bottom and from thence drop into the seed-spout.

Having thus fully described my invention, what I claim is—

In a seed-planter, the combination with a seedbox, having an inclined bottom and the seed-spout, and the removable scatterer or agitator located in said spout, of the vertical rotatable shaft, the seed-plate secured thereto, having radially-disposed seed-openings therein, the plate secured to the under side of the seed-plate, the plates interposed between said plate and the seed-plate, the projections thereon, the movable seed-slides located in said seed-openings, and formed with
5 slots with which said projections engage, and provided with projections at the inner ends, substantially as described.

In testimony whereof I have affixed my signature in presence of two witnesses.

MARTIN HARMON.

Witnesses:
SAIN WELTY,
R. A. RUSSELL.